(12) United States Patent
Nishio et al.

(10) Patent No.: US 11,892,218 B2
(45) Date of Patent: Feb. 6, 2024

(54) AIR-CONDITIONING APPARATUS AND HEAT-MEDIUM FLOW-RATE CALCULATION METHOD

(71) Applicant: Mitsubishi Electric Corporation, Tokyo (JP)

(72) Inventors: Jun Nishio, Tokyo (JP); Soshi Ikeda, Tokyo (JP); Naofumi Takenaka, Tokyo (JP); Yuji Motomura, Tokyo (JP); Katsuhiro Ishimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 361 days.

(21) Appl. No.: 17/441,295

(22) PCT Filed: May 22, 2019

(86) PCT No.: PCT/JP2019/020309
§ 371 (c)(1),
(2) Date: Sep. 21, 2021

(87) PCT Pub. No.: WO2020/235058
PCT Pub. Date: Nov. 26, 2020

(65) Prior Publication Data
US 2022/0163239 A1   May 26, 2022

(51) Int. Cl.
*F25B 5/02* (2006.01)
*F25B 41/20* (2021.01)

(52) U.S. Cl.
CPC ............... *F25B 5/02* (2013.01); *F25B 41/20* (2021.01)

(58) Field of Classification Search
CPC .................................. F25B 5/02; F25B 41/20
(Continued)

(56) References Cited

U.S. PATENT DOCUMENTS 8,964,338 B2 *  2/2015  Wallis ................... F04C 28/28
                                                 318/434
9,003,823 B2 *  4/2015  Tanaka ................... F25B 13/00
                                                 62/175
(Continued)

FOREIGN PATENT DOCUMENTS

JP    2014-35102 A    2/2014
JP    2015-45478 A    3/2015
(Continued)

OTHER PUBLICATIONS

International Search Report and Written Opinion dated Aug. 6, 2019, received for PCT Application PCT/JP2019/020309, Filed on May 22, 2019, 9 pages including English Translation.

*Primary Examiner* — Claire E Rojohn, III
(74) *Attorney, Agent, or Firm* — XSENSUS LLP

(57) ABSTRACT

An air-conditioning apparatus includes: a heat-source-side device that heats or cools a heat medium; a pump that sucks and transfers the heat medium; use-side heat exchangers; a heat medium circuit; flow rate control devices; indoor-side pressure sensors; a pump inlet-side pressure sensor and/or a pump outlet-side pressure sensor; a flow rate detection device that detects a pump flow rate; and a controller that performs a first operation in which the flow rate control devices are individually opened or closed and data regarding a flow passage resistance at a path related to each of the heat exchangers is obtained, and a second operation in which heat is supplied to indoor air, and calculates calculate flow rates of the heat medium that flows through the heat exchangers in the second operation, from pump flow rates and pressures detected by the pressure sensors in the first and second operations.

13 Claims, 6 Drawing Sheets

(58) Field of Classification Search
USPC .......................................................... 62/196.1
See application file for complete search history.

(56) References Cited

U.S. PATENT DOCUMENTS

| | | | |
|---|---|---|---|
| 9,244,466 B2* | 1/2016 | DuPlessis | G05D 23/132 |
| 9,464,840 B2* | 10/2016 | Boyko | F25B 47/02 |
| 9,551,504 B2* | 1/2017 | Arensmeier | F24F 11/89 |
| 9,696,043 B2* | 7/2017 | Ward | F24H 15/223 |
| 9,921,591 B2* | 3/2018 | Renggli | G05B 15/00 |
| 2009/0211282 A1* | 8/2009 | Nishimura | F24F 5/0096 |
| | | | 62/335 |
| 2012/0043054 A1 | 2/2012 | Shimazu et al. | |
| 2012/0234032 A1 | 9/2012 | Yamashita et al. | |
| 2019/0271478 A1* | 9/2019 | Henderson | F25B 41/20 |
| 2019/0271493 A1* | 9/2019 | Ray, Jr. | F25B 5/02 |
| 2019/0277550 A1* | 9/2019 | Yokozeki | F25B 49/02 |
| 2022/0205675 A1* | 6/2022 | Miura | F25B 13/00 |

FOREIGN PATENT DOCUMENTS

| | | |
|---|---|---|
| WO | 2010/131335 A1 | 11/2010 |
| WO | 2011/064814 A1 | 6/2011 |

\* cited by examiner

AIR-CONDITIONING APPARATUS AND HEAT-MEDIUM FLOW-RATE CALCULATION METHOD

CROSS-REFERENCE TO RELATED APPLICATION

The present application is based on PCT filing PCT/JP2019/020309, filed May 22, 2019, the entire contents of which are incorporated herein by reference.

TECHNICAL FIELD

The present disclosure relates to an air-conditioning apparatus and a heat-medium flow-rate calculation method, and in particular the flow rates of a heat medium that flows through heat exchangers.

BACKGROUND ART

For example, a given air-conditioning apparatus includes a refrigeration cycle circuit (refrigerant cycle circuit) in which an outdoor unit and a relay unit are connected by a pipe, to thereby circulate heat-source-side refrigerant, the heat-source-side refrigerant, and a heat medium circuit in which the relay unit and indoor units are connected by pipes, to thereby circulate a heat medium (indoor-side refrigerant). In a heat-source-side refrigerant cycle circuit, the outdoor unit and the relay unit are connected by a pipe, and in the heat medium circuit, the relay unit and the indoor units are connected by the pipes. Heat exchange is performed between the heat medium and the heat-source-side refrigerant at a heat-medium heat exchanger included in the relay unit, whereby the heat medium supplies heating energy or cooling energy to an indoor side, thereby performing air-conditioning.

In such an air-conditioning apparatus, the flow rates of the heat medium that flows through heat exchangers in use units are checked, to thereby enable a transporting power of a heat medium to be optimized, and also heat loads at the respective indoor units to be estimated. In view of the above, in a known air-conditioning system, the flow rates of the heat medium in the respective use-side heat exchangers are estimated from the opening degrees of flow rate control devices (for example, see Patent Literature 1). In this air-conditioning system, an individual flow-rate calculation unit individually calculates the flow rates of the heat medium that flow through the respective use units on the basis of opening-degree information regarding use-side valves that serve as the flow rate control devices and the result of checking by a flow-rate checking unit.

CITATION LIST

Patent Literature

Patent Literature 1: Japanese Unexamined Patent Application Publication No. 2014-035102

SUMMARY OF INVENTION

Technical Problem

However, the air-conditioning system described in Patent Literature 1 estimates the ratio between the flow rates of the use-side heat exchangers on the basis of the opening degrees of the flow rate control devices associated with the respective use-side heat exchangers. Thus, in the case where, for example, the pressure losses at a pipe and a branch portion are large, the air-conditioning system cannot accurately estimate the flow rates of the heat medium that passes through the respective use-side heat exchangers.

The present disclosure is applied to solve the above problem, and relates to an air-conditioning apparatus and a heat-medium flow-rate calculation method that can accurately estimate the flow rates of a heat medium that flows through use-side heat exchangers.

Solution to Problem

An air-conditioning apparatus according to the present disclosure includes: a heat-source-side device that heats or cools a heat medium serving as a medium that transfers heat; a pump that sucks the heat medium and transfers the heat medium; a plurality of use-side heat exchangers each of which causes heat exchange to be performed between the heat medium transferred by the pump and indoor air to be conditioned; a heat medium circuit that includes a common pipe at which the heat-source-side device and the pump are provided, and parallel pipes that branch off from the common pipe and that are pipes at each of which an associated one of the plurality of use-side heat exchangers is provided, the heat medium circuit being provided such that the common pipe and the parallel pipes are connected, whereby the heat medium circulates; a plurality of flow rate control devices provided in association with the use-side heat exchangers and at least upstream or downstream of the use-side heat exchangers, the plurality of flow rate control devices being configured to control flow rates of the heat medium that passes through the use-side heat exchangers; a plurality of indoor-side pressure sensors each of which detects a pressure of the heat medium at least on a heat-medium inflow side or a heat-medium outflow side of an associated one of the flow rate control devices; at least one of a pump inlet-side pressure sensor that detects a pressure of the heat medium on a suction side of the pump and a pump outlet-side pressure sensor that detects a pressure of the heat medium on a transferring side of the pump; a flow rate detection device that detects a pump flow rate that is a flow rate of the heat medium that flows in the pump; and a controller that controls components included in the heat medium circuit. The controller performs a first operation in which the heat medium circuit is caused to circulate the heat medium, the flow rate control devices are individually opened or closed in a predetermined pattern, and data regarding flow rates and pressures of the heat medium that flows through the respective use-side heat exchangers is obtained, and a second operation in which after the first operation, the heat medium is caused to pass through the use-side heat exchangers that supply heat to the indoor air. Furthermore, the controller calculates flow rates of the heat medium that flows through the respective use-side heat exchangers in the second operation, from pump flow rates and pressures in the first operation and the second operation, the pressures being detected by the indoor-side pressure sensors associated with the respective flow rate control devices and the pump inlet-side pressure sensor or the pump outlet-side pressure sensor.

A heat-medium flow-rate calculation method according to the present disclosure is carried out using a controller configured to control a heat medium circuit in which for a heat-source-side device and a pump, a plurality of use-side heat exchangers and a plurality of flow rate control devices are connected in parallel by pipes, the heat-source-side device being configured to heat or cool a heat medium serving as a medium that transfers heat, the pump being configured to suck and transfer the heat medium, the plurality of use-side heat exchangers being each configured to cause heat exchange to be performed between the heat medium and indoor air to be conditioned, the flow rate control devices being control flow rates of the heat medium that passes through the use-side heat exchangers. The heat-medium flow-rate calculation method includes: performing a first operation in which an operation of circulating the heat medium, with one of the flow rate control devices opened and an other or others of the flow rate control devices closed is performed, while the flow rate control devices are successively opened, and obtaining data regarding paths that extend from the pump to the respective use-side heat exchangers, from pressures of the heat medium that passes through the respective flow rate control devices, at least one of a pressure of the heat medium on a suction side of the pump and a pressure of the heat medium on the transferring side of the pump, and a pump flow rate; and in a second operation in which the heat medium is caused to pass through the use-side heat exchangers and heat is supplied to the indoor air, calculating flow rates of the heat medium that flows through the respective use-side heat exchangers, from pressures of the heat medium that passes through the respective flow rate control devices, at least either pressures of the heat medium on the suction side of the pump or pressures of the heat medium on the transferring side of the pump, and pump flow rates in the first operation and the second operation.

Advantageous Effects of Invention

According to an embodiment of the present disclosure, the indoor-side pressure sensors are each provided on at least one of the heat medium inflow side or the heat medium outflow side of an associated one of the plurality of flow rate control devices, the first operation is performed, the flow rate control devices are opened and closed, and for example, the relationships between flow rates and pressures at paths regarding the respective use-side heat exchangers are obtained as data. In the second operation, using the data obtained in the first operation, the flow rates of the heat medium that flows through the respective use-side heat exchangers are calculated. Thus, by using the data obtained in the first operation, the flow rates of the heat medium that flows through the respective use-side heat exchangers can be estimated with high accuracy in the second operation even in the heat medium circuit in which the pressure loss at pipes, branch portions, etc., is large.

DESCRIPTION OF EMBODIMENTS

In the following, air-conditioning apparatuses according to Embodiments 1 to 5 will be described with reference to the drawings. In each of figures to be referred to below, components that are the same as or equivalent to those in a previous figure or figures are denoted by the same reference signs. The same is true of the entire text of the Description of Embodiments. In each of the figures, a relationship or relationships in size between components may be different from those between actual components. Also, the configurations of components are described by way of example, and are not limited to those described in the specification. In particular, in the case where components are combined, it is not limited to the case where components according to the same embodiment are combined. A component in an embodiment can be applied to another embodiment as appropriate. Also, the levels of temperature, pressure, etc., are not determined in relation to absolute values, that is, they are relatively determined in accordance with the state and operation of a component or components, for example. In addition, with respect to a plurality of components that are of the same type and distinguished from each other by suffixes, in the case where they do not particularly need to be identified or distinguished from each other, the suffixes may be omitted.

Embodiment 1

<Air-Conditioning Apparatus 100>

Figure 1:
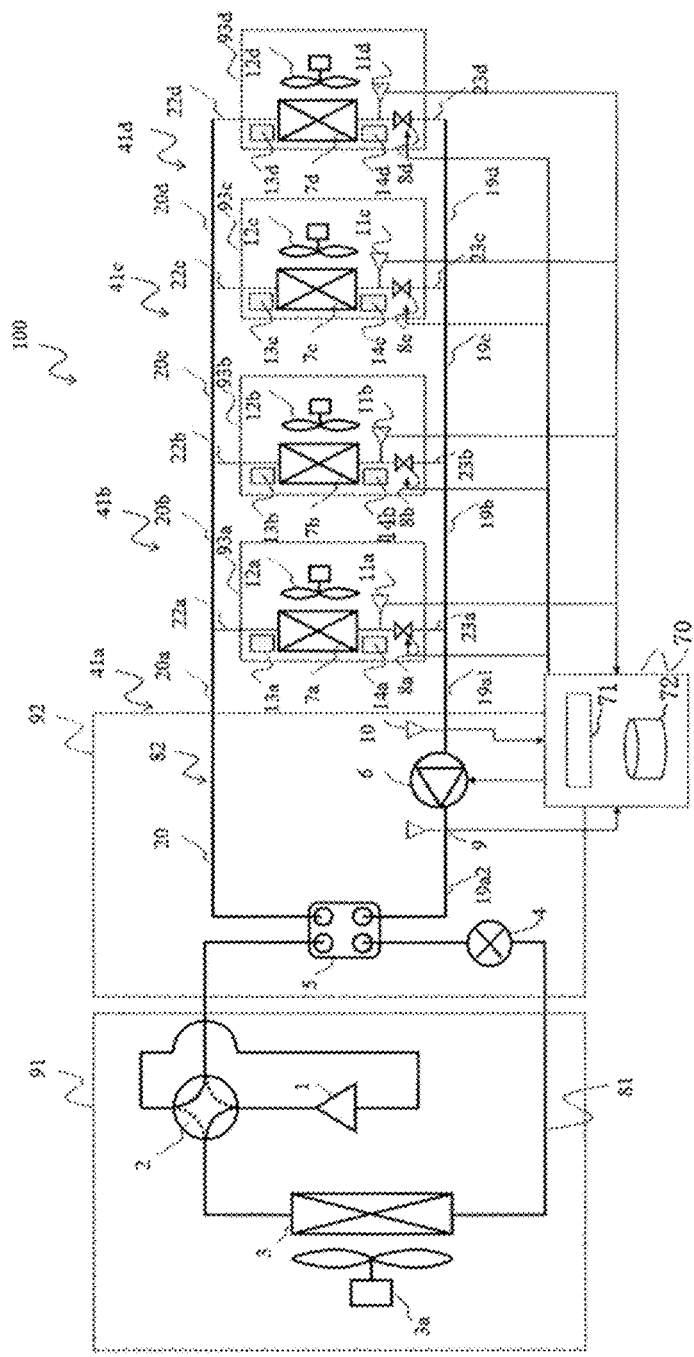
FIG. 1 is a diagram illustrating the configuration of an air-conditioning apparatus according to Embodiment 1.

FIG. 1 is a diagram illustrating the configuration of an air-conditioning apparatus according to Embodiment 1. As illustrated in FIG. 1, an air-conditioning apparatus 100 includes a single outdoor unit 91, a single relay unit 92, and four indoor units 93 (indoor units 93a to 93d) as separate units. To be more specific, a compressor 1, a flow switching valve 2, an outdoor heat exchanger 3, an expansion device 4, and an intermediate heat exchanger 5 are connected by pipes to form a refrigerant circuit 81 that circulates refrigerant. Furthermore, a pump 6, the intermediate heat exchanger 5, use-side heat exchangers 7, and flow rate control devices 8 are connected by pipes other than the pipes for use in the refrigerant circuit 81 to form a heat medium circuit that circulates a liquid heat medium that is different from refrigerant, such as water or antifreeze. In this case, water is circulated as a heat medium, and a water circuit 82 is provided as the heat medium circuit. In the water circuit 82, the use-side heat exchangers 7 of the indoor units 93 are connected in parallel by pipes. In this case, in the water circuit 82, the refrigerant circuit 81 including the intermediate heat exchanger 5 serves as a heat-source-side device that supplies heat to water that circulates in the water circuit 82. The heat-source-side device is a device that cools or heats, using heat in an outdoor space, a heat medium that is applied to air-conditioning of an indoor space.

<Outdoor Unit 91>

In Embodiment 1, the outdoor unit 91 is, for example, a heat source unit installed outside a room that is an air-conditioned space, and exhausts heat related to air-conditioning to the outside or supplies heat related to air-conditioning. The outdoor unit 91 of Embodiment 1 includes the compressor 1, the flow switching valve 2, and the outdoor heat exchanger 3 that are included in the components of the refrigerant circuit 81. The outdoor unit 91 also includes an outdoor fan 3a that is an air sending device configured to send air to the outdoor heat exchanger 3.

The compressor 1 sucks refrigerant, compresses the sucked refrigerant into high-temperature and high-pressure refrigerant, and discharges the high-temperature and high-pressure refrigerant. The compressor 1 of Embodiment 1 is, for example, an inverter compressor whose capacity can be controlled. The flow switching valve 2 is, for example, a four-way valve. The flow switching valve 2 switches a flow passage to be used, between a refrigerant flow passage for a cooling operation of cooling water that circulates in the water circuit 82 is cooled and a refrigerant flow passage for a heating operation of heating water that circulates in the water circuit 82. The outdoor heat exchanger 3 causes heat exchange to be performed between outdoor air and the refrigerant. In this case, the outdoor heat exchanger 3 operates as a condenser or a gas cooler in the cooling operation and operates as an evaporator in the heating operation. The outdoor fan 3a supplies outdoor air to the outdoor heat exchanger 3.

<Relay Unit 92>

The relay unit 92 causes heat exchange to be performed between refrigerant and the heat medium. The relay unit 92 includes the expansion device 4 and the intermediate heat exchanger 5 that are included in the components of the refrigerant circuit 81. The relay unit 92 also includes the pump 6 that are included in the components of the water circuit 82. For example, in a building, the relay unit 92 is installed in a non-air-conditioned space that is a space other than an air-conditioned space or spaces where the indoor units 93 are installed.

The expansion device 4 has a function of a pressure reducing valve or an expansion valve that reduces the pressure of refrigerant to expand the refrigerant. The intermediate heat exchanger 5 includes a heat transfer unit that allows refrigerant to pass therethrough and a heat transfer unit that allows the heat medium to pass therethrough, and causes heat exchange to be performed between the refrigerant and the heat medium. In Embodiment 1, the intermediate heat exchanger 5 operates as a condenser in the heating operation and causes the refrigerant to transfer heat to the heat medium to heat the heat medium; and the intermediate heat exchanger 5 operates as an evaporator in the cooling operation and causes the refrigerant to absorb heat from the heat medium to cool the heat medium.

The pump 6 is a heat-medium sending device, and sucks and pressurizes water and then transfers the water to circulate the water in the water circuit 82. The pump 6 changes the rotation speed of a built-in motor (not illustrated) within a predetermined range, to thereby change a discharge rate that is a flow rate at which the heat medium is transferred. The pump 6 of Embodiment 1 is provided at a return main pipe 19a, which will be described later.

<Indoor Units 93>

Each of the indoor units 93 is installed in, for example, a room that is an air-conditioned space, and supplies air-conditioned air. The indoor unit 93 includes the use-side heat exchanger 7 and the flow rate control device 8 that are included in the components of the water circuit 82. As described above, the air-conditioning apparatus 100 of Embodiment 1 includes the four indoor units 93a to 93d, and the indoor units 93a to 93d include the use-side heat exchangers 7a to 7d and the flow rate control devices 8a to 8d, respectively.

The use-side heat exchangers 7 cause heat exchange to be performed between the heat medium and air in an indoor space that is an air-conditioned space to generate conditioned air to be supplied to the air-conditioned space. Indoor air is sent to the use-side heat exchangers 7a and the use-side heat exchangers 7d from respective indoor fans 12 (indoor fans 12a to 12d). Each of the flow rate control devices 8 adjusts the flow rate of water that flows through an associated one of the use-side heat exchangers 7. The flow rate control device 8 is, for example, an electromagnetic on-off valve. The flow rate control device 8 operates in response to a signal sent from a controller 70. The flow rate control device 8 may be an on-off valve the state of which is switched between a fully opened state and a fully closed state. The flow rate control device 8 may also be a valve the opening degree of which can be adjusted by stages between opening degrees corresponding to the fully closed state and the fully open state, to thereby adjust the flow rate.

Embodiments will be described with respect to an example in which the indoor units 93a to 93d include the use-side heat exchangers 7a to 7d and the flow rate control devices 8a to 8d, respectively; however, the number of indoor units, the number of use-side heat exchangers, and the number of flow rate control devices are not limited. In a case that will be described later, four paths 41 that are paths 41a to 41d are provided, however, the number of paths 41 is not limited to a specific one, as long as the use-side heat exchangers 7 are connected in parallel.

The pipes in the water circuit 82 will be described. The use-side heat exchangers 7a to 7d are provided at respective pipes arranged in parallel (which will hereinafter be referred to as parallel pipes). The use-side heat exchangers 7a to 7d also include a pipe (hereinafter referred to as a common pipe) through which water from all the parallel pipes flows. The parallel pipes branch off from the common pipe and are connected such that water heated or cooled at the intermediate heat exchanger 5 circulates. The pump 6 and the intermediate heat exchanger 5 are provided at the common pipe. The pump 6 and the intermediate heat exchanger 5 are located before points at which the parallel pipes branch off from a circulation pipe in a supply path of the circulation pipe or after points at which the parallel pipes join a circulation pipe in a return path of the circulation pipe. The water circuit 82 of Embodiment 1 is configured such that water that has passed through the pump 6 and the intermediate heat exchanger 5 passes through a main pipe, branch off to flow the branch pipes in turn and then flows into the use-side heat exchangers 7a to 7d. The pipes of the water circuit 82 include return main pipes 19 (the return main pipes 19a to 19d), return branch pipes 23 (return branch pipes 23a to 23d), supply main pipes 20 (forward main pipes 20a to 20d), and supply branch pipes 22 (supply branch pipes 22a to 22d).

The supply main pipes 20 and the supply branch pipes 22 serve as flow passages for water that is sent from the intermediate heat exchanger 5 to the use-side heat exchanger 7. The supply main pipe 20a and the supply branch pipe 22a are pipes that extend from the intermediate heat exchanger 5 to the use-side heat exchanger 7a of the indoor unit 93a. The supply main pipe 20b and the supply branch pipe 22b are pipes that extend from a connection portion between the supply main pipe 20a and the supply branch pipe 22a to the use-side heat exchanger 7b of the indoor unit 93b. Furthermore, the supply main pipe 20c and the supply branch pipe 22c are pipes from a connection portion between the supply main pipe 20b and the supply branch pipe 22b to the use-side heat exchanger 7c of the indoor unit 93c. The supply main pipe 20d and the supply branch pipe 22d are pipes that extend from a connection portion between the supply main pipe 20c and the supply branch pipe 22c to the use-side heat exchanger 7d of the indoor unit 93d.

The return main pipes 19 and the return branch pipes 23 serve as flow passages for water that return from the use-side heat exchanger 7 to the intermediate heat exchanger 5. The return main pipe 19a and the return branch pipe 23a are pipes that extend from the use-side heat exchanger 7a of the indoor unit 93a to the intermediate heat exchanger 5. In this case, part of the return main pipe 19a that extends from a connection portion between the return main pipe 19a and the return branch pipe 23a to the pump 6 will be referred to as a return main pipe 19a1, and part of the return main pipe 19a that extends from the pump 6 to the intermediate heat exchanger 5 will be referred to as a return main pipe 19a2. The return main pipe 19b and the return branch pipe 23b are pipes that extend from the use-side heat exchanger 7b of the indoor unit 93b to a connection portion between the return main pipe 19a and the return branch pipe 23a. Furthermore, the return main pipe 19c and the return branch pipe 23c are pipes that extend from the use-side heat exchanger 7c of the indoor unit 93c to a connection portion between the return main pipe 19b and the return branch pipe 23b. The return main pipe 19d and the return branch pipe 23d are pipes from the use-side heat exchanger 7d of the indoor unit 93d to a connection portion between the return main pipe 19c and the return branch pipe 23c. In this case, the water circuit 82 will be described with respect to an example in which the pipes are connected such that the supply main pipes 20 and the return main pipes 19 successively branch into branch pipes and join each other at intermediate points; however, it is not limiting. For example, the pipes may be connected such that the supply main pipes 20 and the return main pipes 19 may each branch off from an intermediate point or an end thereof to extend to two or more use-side heat exchangers 7 and then join each other.

Next, various sensors provided in the water circuit 82 and serving as detection devices configured to detect physical quantities will be described. The water circuit 82 of Embodiment 1 includes a pump inlet-side pressure sensor 10, a pump outlet-side pressure sensor 9, indoor-side pressure sensors 11, use-side heat exchanger inlet-side temperature sensors 13, and use-side heat exchanger outlet-side temperature sensors 14. The pump inlet-side pressure sensor 10 is provided at the return main pipe 19a after a last join connection portion of the return branch pipe 23a in the flow direction of water. The pump outlet-side pressure sensor 9 is provided at the supply main pipe 20a before a first branching connection portion of the supply branch pipe 22a in the flow direction of water. That is, the pump inlet-side pressure sensor 10 and the pump outlet-side pressure sensor 9 are provided at the common pipe. The indoor-side pressure sensors 11, the use-side heat exchanger inlet-side temperature sensors 13, and the use-side heat exchanger outlet-side temperature sensors 14 are provided at respective branch pipes that branch off from the main pipe, that is, potions corresponding to the respective parallel pipes.

The pump inlet-side pressure sensor 10 detects the pressure of water that is sucked into the pump 6. The pump outlet-side pressure sensor 9 detects the pressure of water transferred by the pump 6. The indoor-side pressure sensors 11 are provided in the respective indoor units 93 to detect the pressure of water that passes through the respective indoor units 93. Thus, the air-conditioning apparatus 100 of Embodiment 1 includes indoor-side pressure sensors 11a to 11d. In this case, in the air-conditioning apparatus 100 of Embodiment 1, each of the indoor-side pressure sensors 11 is provided between a downstream side that is a water outflow side of an associated one of the use-side heat exchangers 7 and an upstream side that is a water inflow side of the flow rate control device 8. In this case, as described below, the pump inlet-side pressure sensor 10 and the pump outlet-side pressure sensor 9 are provided to calculate the flow rate of water that flows through the pump 6, on the basis of a detected pressure of water. Thus, in the case where the flow rate of water that flows through the pump 6 can be obtained by, for example, performing a measurement using a flowmeter or performing an estimation from the rotation speed of the pump 6, it suffices that only one of the pump inlet-side pressure sensor 10 and the pump outlet-side pressure sensor is provided. The following description is made regarding a configuration in which both the pump inlet-side pressure sensor 10 and the pump outlet-side pressure sensor 9 are provided; however, one of the pump inlet-side pressure sensor 10 and the pump outlet-side pressure sensor 9 may be used as a device configured to detect the flow rate of water that flows through the pump 6, and the detected flow rate may be used instead of a pressure value.

The use-side heat exchanger inlet-side temperature sensors 13 (use-side heat exchanger inlet-side temperature sensors 13a to 13d) serving as use-side heat exchanger temperature sensors detect the temperatures of water that is to flow into the use-side heat exchangers 7. The use-side heat exchanger outlet-side temperature sensors 14 (use-side heat exchanger outlet-side temperature sensors 14a to 14d) detect the temperatures of water that flows thereout from the use-side heat exchangers 7.

The controller 70 controls the components provided in the air-conditioning apparatus 100 to control the entire apparatus. The controller 70 includes a control processing unit 71 and a storage unit 72. The control processing unit 71, for example, controls the components. In particular, in Embodiment 1, in a first operation that will be described later, the control processing unit 71 controls opening and closing of each of the flow rate control devices 8 under predetermined conditions. The control processing unit 71 acquires pressures detected by the pump inlet-side pressure sensor 10, the pump outlet-side pressure sensor 9, and each of the indoor-side pressure sensors 11, calculates, for example, a resistance of the flow passage, and stores the resistance of the flow passage in the storage unit 72. Then, in a second operation, the control processing unit 71 carries out steps related to a heat-medium flow-rate calculation method of calculating the flow rate of water that is a heat medium flowing through each use-side heat exchanger 7 in the second operation, on the basis of a relationship between a pressure and a flow rate that are calculated from the pressures detected by the pump inlet-side pressure sensor 10, the pump outlet-side pressure sensor 9, and each indoor-side pressure sensor 11 and data regarding the first operation. The control processing unit 71 is, for example, a microcomputer that is hardware. The microcomputer includes, for example, a control arithmetic processing unit such as a central processing unit (CPU), an analog circuit, and a digital circuit. The following description is made on the premise that a control to be performed by the control processing unit 71 is performed by the controller 70. It should be noted that it is not indispensable that the control processing unit 71 and the storage unit 72 of the controller 70 and part of the control processing unit 71 that performs a calculation processing to calculate a flow rate of water are made integrally with each other, that is, he control processing unit 71 and the storage unit 72 of the controller 70 and part of the control processing unit 71 may be made as separate units.

The storage unit 72 stores data that is necessary for processing by the controller 70. In particular, in Embodiment 1, the storage unit 72 stores as data, pressures detected by the pump outlet-side pressure sensor 9 and the pump inlet-side pressure sensor 10 and pressures detected by the respective indoor-side pressure sensors 11 in the first operation and the second operation, which will be described later. The storage unit 72 is, for example, a volatile storage device (not illustrated), a hard disk, and a non-volatile auxiliary storage (not illustrated). The volatile storage device can temporarily store data, and is, for example, a random access memory (RAM). The non-volatile auxiliary storage can store data for a long time period, and is, for example, a flash memory.

The following description is made on the premise that the relay unit 92 includes the controller 70; however, the location of the controller 70 is not limited to a specific one. The air-conditioning apparatus 100 of Embodiment 1 performs two kinds of operations, that is, the first operation and the second operation, under a control by the controller 70.

<First Operation>

The first operation is an operation that is performed in, for example, a test run in which residual air is discharged from the inside of the water circuit 82, in the case where the water circuit 82 of the air-conditioning apparatus 100 is installed in, for example, a building. In the first operation, an operation to circulate water serving as a heat medium is performed, with one of the flow rate control devices 8 opened and the others closed. The flow rate control devices 8 are successively opened such that one of the flow rate control devices 8 is opened at a time, and the first operation is performed, with one of the flow rate control devices 8 opened, each time the flow rate control device 8 to be opened is changed. Alternatively, the operation may be performed, with one of the flow rate control devices 8 closed and the others opened. The flow rate control devices 8 are successively closed such that one of the flow rate control devices 8 is closed at a time, and the first operation is performed, with one of the flow rate control devices 8 closed, each time the flow rate control device 8 to be closed is changed.

In the first operation, the controller 70 controls opening and closing of the flow rate control devices 8 individually as described above. In this case, pressures detected by the indoor-side pressure sensors 11 associated with the respective flow rate control devices 8, the pump inlet-side pressure sensor 10, and the pump outlet-side pressure sensor 9 are acquired as data. In Embodiment 1, the controller 70 calculates the pump flow rate at the pump 6 from the difference between water pressures on the inflow side and outflow side of the pump 6. The controller 70 calculates a flow passage resistance and other values from the pressures detected by the respective indoor-side pressure sensors 11, the pump inlet-side pressure sensor 10, and the pump outlet-side pressure sensor 9, and stores a relationship between the pressures and flow rates of water that passes through the respective use-side heat exchangers 7 as data in the storage unit 72.

<Second Operation>

The second operation is an operation that is performed after the first operation is performed. The second operation is, for example, a normal cooling/heating operation. Thus, one or more flow rate control devices 8 that are associated with one or more of the indoor units 93 that perform air conditioning are opened to cause water to pass through one or more of the use-side heat exchangers 7 that are associated with the one or more indoor units 93. While the second operation is being performed, pressures detected by one or more of the indoor-side pressure sensors 11 that are associated with the one or more flow rate control devices 8 and pressures detected by the pump inlet-side pressure sensor 10 and the pump outlet-side pressure sensor 9 are acquired. From the pressures detected by the above pressure sensors in the first operation and the pressures detected by the above pressure sensors in the second operation, the controller 70 calculates the flow rate of water that passes through each use-side heat exchanger 7 in the second operation. Furthermore, for example, the amount of heat at each indoor unit 93 can also be calculated on the basis of the water flow rate. In this case, the second operation is, for example, a normal operation in which an indoor space that is an air-conditioned space is air-conditioned in response to, for example, a request for lowering or raising the temperature of air in the indoor space.

<Flow of Water in Water Circuit 82>

Next, the flow of water, which is a heat medium, in the water circuit 82 will be described with reference to FIG. 1. Water transferred by the pump 6 passes through the return main pipe 19a2 and flows into the intermediate heat exchanger 5. At this time, the pump outlet-side pressure sensor 9 detects the pressure of water transferred by the pump 6. Water that has flowed into the intermediate heat exchanger 5 exchanges heat with refrigerant. Water that has passed through the intermediate heat exchanger 5 flows through the supply main pipe 20a.

Water that has passed through the supply main pipe 20a branches off to flow through the supply main pipe 20b and the supply branch pipe 22a. Water that has passed through the supply branch pipe 22a passes through the use-side heat exchanger 7a. In the use-side heat exchanger 7a, heat exchange is performed between air in the indoor space and water. The water then passes through the flow rate control device 8a, the return branch pipe 23a, and the return main pipe 19a1, and returns to the pump 6. In this case, the indoor-side pressure sensor 11a detects the pressure of water that has passed through the use-side heat exchanger 7a. In this case, a path that extends from the pump 6 to the indoor-side pressure sensor 11a through the pump outlet-side pressure sensor 9 will be referred to as the path 41a. The paths 41a to 41d are paths for obtaining the differences between the pressure at the outlet side of the pump 6 provided at the common pipe and the pressures on the indoor side where the parallel pipes are provided. In Embodiment 1, the pump outlet-side pressure sensor 9 detects the pressure at the outlet side of the pump 6, the indoor-side pressure sensor 11a detects the pressure at the use-side heat exchanger 7a, and the pressure difference between the detected pressures is used. Thus, the path 41a is a path that extends through the return main pipe 19a2, the intermediate heat exchanger 5, the supply main pipe 20a, the supply branch pipe 22a, and the use-side heat exchanger 7a. In this case, as described later regarding the other embodiments, a pressure detected by the pump inlet-side pressure sensor 10 may be used as the pressure at the outlet side of the pump 6. The indoor-side pressure sensors 11a to 11d may be provided either on the upstream side or the downstream side of the flow rate control devices 8a to 8d; however, preferably, the indoor-side pressure sensors 11a to 11d should be provided on the same side, which is either the upstream side or the downstream side.

Water that has passed through the supply main pipe 20b branches off to flow through the supply main pipe 20c and the supply branch pipe 22b. Water that has passed through the supply branch pipe 22b passes through the use-side heat exchanger 7b. In the use-side heat exchanger 7b, heat exchange is performed between air in the indoor space and water. The water then passes through the flow rate control device 8b, the return branch pipe 23b, the return main pipe 19b, and the return main pipe 19a1, and returns to the pump 6. In this case, the indoor-side pressure sensor 11b detects the pressure of water that has passed through the use-side heat exchanger 7b. In this case, a path that extends from the pump 6 to the indoor-side pressure sensor 11b through the pump outlet-side pressure sensor 9 will be referred to as the path 41b. Thus, the path 41b is a path that extends through the return main pipe 19a2, the intermediate heat exchanger 5, the supply main pipe 20a, the supply main pipe 20b, the supply branch pipe 22b, and the use-side heat exchanger 7b.

Water that has passed through the supply main pipe 20c branches off to flow through the supply main pipe 20d and the supply branch pipe 22c. Water that has passed through the supply branch pipe 22c passes through the use-side heat exchanger 7c. In the use-side heat exchanger 7c, heat exchange is performed between air in the indoor space and water. The water then passes through the flow rate control device 8c, the return branch pipe 23c, the return main pipe 19c, the return main pipe 19b, and the return main pipe 19a1, and returns to the pump 6. In this case, the indoor-side pressure sensor 11c detects the pressure of water that has passed through the use-side heat exchanger 7c. In this case, a path that extends from the pump 6 to the indoor-side pressure sensor 11c through the pump outlet-side pressure sensor 9 and up will be referred to as the path 41c. Thus, the path 41c is a path that extends through the return main pipe 19a2, the intermediate heat exchanger 5, the supply main pipe 20a, the supply main pipe 20b, the supply main pipe 20c, the supply branch pipe 22c, and the use-side heat exchanger 7c.

Water that has passed through the supply main pipe 20d flows through the supply branch pipe 22d and passes through the use-side heat exchanger 7d. In the use-side heat exchanger 7d, heat exchange is performed between air in the indoor space and water. The water then passes through the flow rate control device 8d, the return branch pipe 23d, the return main pipe 19d, the return main pipe 19c, the return main pipe 19b, and the return main pipe 19a1, and returns to the pump 6. In this case, the indoor-side pressure sensor 11d detects the pressure of water that has passed through the use-side heat exchanger 7d. In this case, a path that extends from the pump 6 to the indoor-side pressure sensor 11d through the pump outlet-side pressure sensor 9 will be referred to as the path 41d. Thus, the path 41d is a path that extends through the return main pipe 19a2, the intermediate heat exchanger 5, the supply main pipe 20a, the supply main pipe 20b, the supply main pipe 20c, the supply main pipe 20d, the supply branch pipe 22d, and the use-side heat exchanger 7d.

<Calculation of Flow Rate>

The pump flow rate at the pump 6 is determined based on an input voltage that is applied to the pump 6 and a pump head. A characteristic curve of the pump 6 is known and varies depending on the type of the pump 6. Thus, the pump flow rate at the pump 6 can be expressed by equation (1) below using a function F that expresses a relationship between an input voltage and the pump head. In this case, the input voltage is determined by the controller 70. The pump head is the difference between the pressure detected by the pump outlet-side pressure sensor 9 and the pressure detected by the pump inlet-side pressure sensor 10. In this case, when a plurality of pumps 6 are connected in parallel, the flow rate of water that flows through each pump 6 can be calculated by detecting the difference in pressure between an inlet side that is a suction side of the pump 6 and an outlet side that is a transferring side of the pump 6.

$$(\text{Pump flow rate at pump 6}) = F(\text{input voltage, pump head}) \quad (1)$$

The pressure loss in the pipes, the heat exchangers, etc., is proportional to the square of the flow rate. In this case, where a proportionality constant is a flow passage resistance, the pressure loss can be expressed by equation (2) below.

$$(\text{Pressure loss}) = (\text{square of flow rate}) \times (\text{flow passage resistance}) \quad (2)$$

In order to simplify the following description, variables will be defined. The differences in pressure between the pump outlet-side pressure sensor 9 and the indoor-side pressure sensors 11a, 11b, 11c, and 11d are denoted by ΔPa, ΔPb, ΔPc, and ΔPd, respectively. In the water circuit 82, the flow rate of water that flows through the main pipe, etc., is denoted by Grm, and the resistance of the flow passage is denoted by A. The amount of water that flows through the branch pipe, etc., is denoted by Grs, and the resistance of the flow passage is denoted by B. The flow rate of water that flows from the pump 6 and through the return main pipe 19a2, the intermediate heat exchanger 5, and the supply main pipe 20a is denoted by Grma, and the resistance of the flow passage is denoted by Aa. The flow rate of water that flows through the supply main pipe 20b is denoted by Grmb, and the resistance of the flow passage is denoted by Ab. The flow rate of water that flows through the supply main pipe 20c is denoted by Grmc, and the resistance of the flow passage is denoted by Ac. The flow rate of water that flows through the supply main pipe 20d is denoted by Grmd, and the resistance of the flow passage is denoted by Ad. Furthermore, the flow rate of water that flows through the supply branch pipe 22a and the use-side heat exchanger 7a is denoted by Grsa, and the resistance of the flow passage is denoted by Ba. The flow rate of water that flows through the supply branch pipe 22b and the use-side heat exchanger 7b is denoted by Grsb, and the resistance of the flow passage is denoted by Bb. The flow rate of water that flows through the supply branch pipe 22c and the use-side heat exchanger 7c is denoted by Grsc, and the resistance of the flow passage is denoted by Bc. The flow rate of water that flows through the supply branch pipe 22d and the use-side heat exchanger 7d is denoted by Grsd, and the resistance of the flow passage is denoted by Bd.

<Method for Calculating Water Flow Rate from Flow Passage Resistance>

Next, a method of calculating the flow rate of water that flows through each path 41 in the second operation will be described. As described above, the second operation is performed, with one or more out of the flow rate control devices 8 opened. Thus, in the second operation, at least one or all of the indoor units 93 are driven in, for example, the normal cooling-heating operation.

In this case, when the first operation is performed, in the case where pressures detected by the individual indoor-side pressure sensors 11, the pump outlet-side pressure sensor 9, and the pump inlet-side pressure sensor 10 are stored as data in the storage unit 72, the data is sufficient to calculate the flow rates of water that flows through the respective use-side heat exchangers 7 in the second operation. However, in this case, the amount of data to be stored in the storage unit 72 is large. For example, in the case where a larger number of indoor units 93 are provided, and thus a larger number of paths 41, a larger number of number of branches, etc., are provided, the storage unit 72 needs a larger storage capacity, and also, an equation for calculating a flow rate is further complicated. In this case, the flow passage resistances, which are constants that do not depend on operation conditions, are obtained in the first operation from the pressures detected by the respective pressure sensors provided in the water circuit 82, and are stored as data in the storage unit 72. It is therefore possible to save a storage capacity and increase a calculation speed.

The paths 41a, 41b, and 41c branch off partway, and thus the flow rate changes partway. The relationships between the flow rates and pressure losses at the paths 41 can be expressed by equations (3a) to (3d). In this case, the pressure losses are the pressure differences ΔPa to ΔPd between the pump outlet-side pressure sensor 9 and the respective indoor-side pressure sensors 11a to 11d, which are described above.

Path 41a:

$$\Delta Pa = Grma^2 \times Aa + Grsa^2 \times Ba \quad (3a)$$

Path 41b:

$$\Delta Pb = Grma^2 \times Aa + Grmb^2 \times Ab + Grsb^2 \times Bb \quad (3b)$$

Path 41c:

$$\Delta Pc = Grma^2 \times Aa + Grmb^2 \times Ab + Grmc^2 \times Ac + Grsc^2 \times Bc \quad (3c)$$

Path 41d:

$$\Delta Pd = Grma^2 \times Aa + Grmb^2 \times Ab + Grmc^2 \times Ac + Grmd^2 \times Ad + Grsd^2 \times Bd \quad (3d)$$

Furthermore, relationships between the flow rates Grma, Grmb, Grmc, and Grmd and the flow rates Grsa, Grsb, Grsc, and Grsd are satisfied by equations (4a) to (4d).

$$Grmb = Grma - Grsa \quad (4a)$$

$$Grmc = Grmb - Grsb \quad (4b)$$

$$Grmd = Grmc - Grsc \quad (4c)$$

$$Grsd = Grmd \quad (4d)$$

In equations (3a) to (3d), the pressure differences ΔPa to ΔPd can be calculated from voltages detected by the pump outlet-side pressure sensor 9 and the indoor-side pressure sensors 11a to 11d in the second operation. The flow passage resistances Aa, Ab, Ac, Ad, Ba, Bb, Bc, and Bd are constants calculated by the controller 70 from data obtained in the first operation, which will be described below. In equation (4a), the flow rate Grma is the pump flow rate at the pump 6 in the second operation and can be calculated from equation (1).

Therefore, unknowns are the following seven ones: the flow rate Grmb; the flow rate Grmc; the flow rate Grmd; the flow rate Grsa; the flow rate Grsb; the flow rate Grsc; and the flow rate Grsd. Since eight equations are present, all the unknowns can be calculated. That is, the flow rate Grsa can be calculated from equation (3a); the flow rates Grmb and Grsb can be calculated from equations (3b) and (4a); the flow rates Grmc and Grsc can be calculated from equations (3c) and (4b); and the flow rates Grmd and Grsd can be calculated from equations (4c) and (4d).

The flow passage resistances A and the flow passage resistances B each include, for example, a frictional resistance between water and a pipe, the resistance of a branch portion, the resistance of a joint portion, the resistance of a curved portion, and the resistance of each of components such as the heat exchanger, and generally vary from one path 41 to another. In the case where the states of the pipes in the water circuit 82 are known, the flow passage resistances can be stored as data in advance in the storage unit 72. However, for example, the lengths, diameters, and branching positions of the pipes of the air-conditioning apparatus 100 vary depending on a building where the air-conditioning apparatus 100 is installed. It is therefore difficult to store the flow passage resistances A and B in advance in the storage unit 72. Thus, it is very effective to perform a process of determining the flow passage resistances A and B on the basis of the values of physical quantities detected in the first operation, which will be described later.

<Procedure of Calculation of Flow Passage Resistance>

Figure 2:
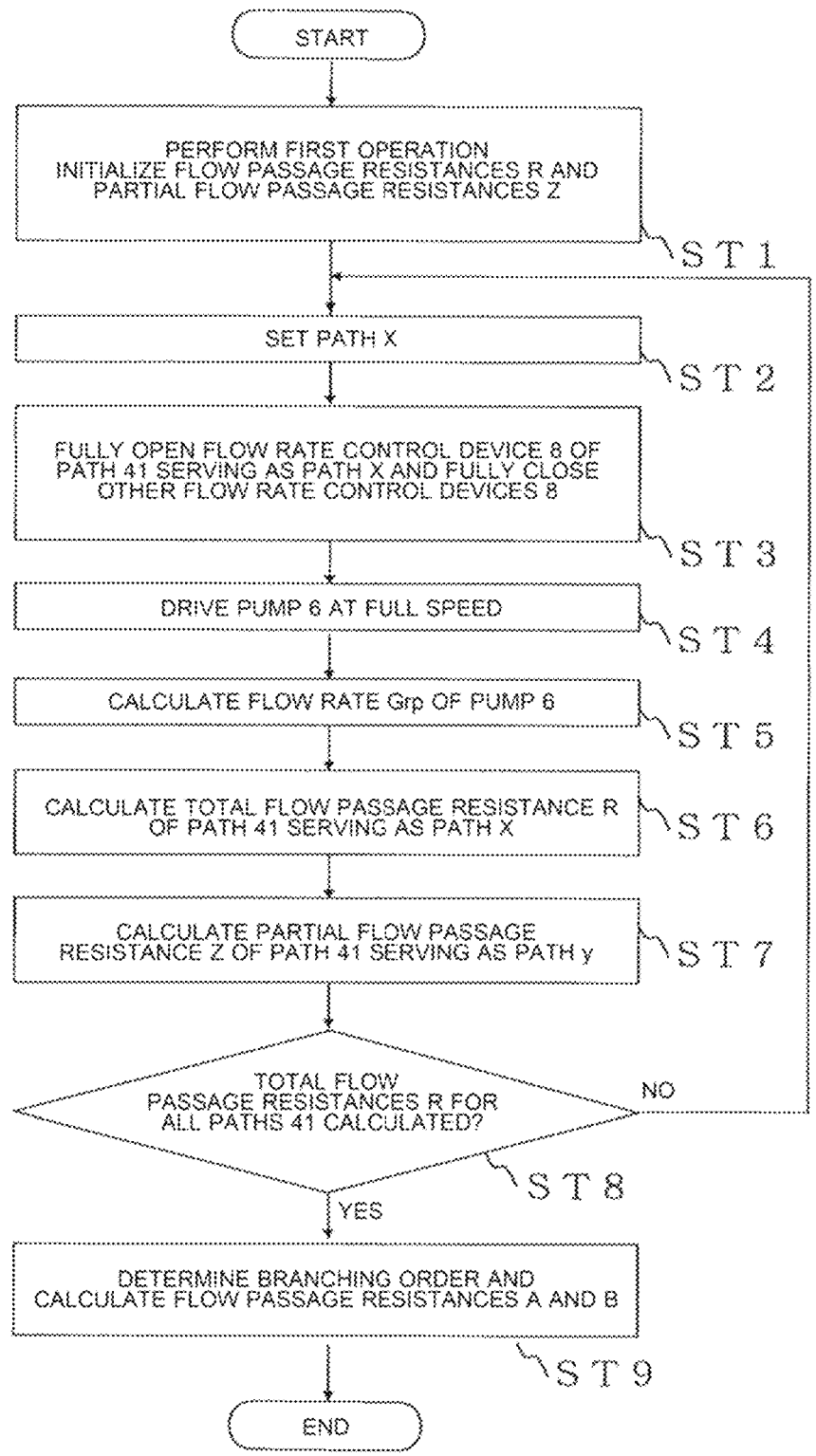
FIG. 2 is a diagram illustrating an example of a processing procedure regarding calculation of a flow passage resistance that is performed by a controller of the air-conditioning apparatus according to Embodiment 1.

FIG. 2 is a diagram illustrating an example of a processing procedure regarding calculation of a flow passage resistance that is performed by the controller of the air-conditioning apparatus according to Embodiment 1. In this case, it is assumed that a total flow passage resistance R corresponds to one of a flow passage resistance Ra of the path 41a, a flow passage resistance Rb of the path 41b, a flow passage resistance Rc of the path 41c, and a flow passage resistance Rd of the path 41d, and a partial flow passage resistance Z corresponds to the resistance of part of one of the paths 41 that is shared by another one of the paths 41. For example, a partial flow passage resistance Za of the path 41a is the resistance of a flow passage that is formed by the return main pipe 19a2, the intermediate heat exchanger 5, and the supply main pipe 20a. A partial flow passage resistance Zb of the path 41b is the resistance of a flow passage that is formed by the return main pipe 19a2, the intermediate heat exchanger 5, the supply main pipe 20a, and the supply main pipe 20b. A partial flow passage resistance Zc of the path 41c is the resistance of a flow passage that is formed by the return main pipe 19a2, the intermediate heat exchanger 5, the supply main pipe 20a, the supply main pipe 20b, and the supply main pipe 20c. A partial flow passage resistance Zd of the path 41d is the resistance of a flow passage formed by the return main pipe 19a2, the intermediate heat exchanger 5, the supply main pipe 20a, the supply main pipe 20b, the supply main pipe 20c, and the supply main pipe 20d.

The controller 70 performs the first operation (step ST1). The first operation is performed in, for example, a test run through which residual air is let out of the inside of the water circuit 82, for example, when the water circuit 82 of the air-conditioning apparatus 100 is installed in, for example, a building. In step ST1, the flow passage resistances Ra, Rb, Rc, and Rd and the partial flow passage resistances Za, Zb, Zc, and Zd are initialized to zero.

In the first operation, a path 41 for which the total flow passage resistance R is not calculated is set as a path X that is a calculation target (step ST2). It is assumed that in Embodiment 1, the branching order of the paths 41a to 41d is not input as data in the storage unit 72 in advance. Thus, it is not possible to determine that a path 41 that is located on the uppermost stream side and closest to the transferring side of the pump 6 and the intermediate heat exchanger 5 is the path 41a. Thus, a determination regarding the branching order can also be made at the same time as the path X is set. The following description is made with respect to the case where a path 41 that is first set as the path X is the path 41b.

The controller 70 performs a control to fully open the flow rate control device 8 at the path 41 set as the path X and a control to fully close the other flow rate control devices 8 (step ST3). In this case, a control is performed to fully open the flow rate control device 8b and to fully close the other flow rate control devices 8a, 8c, and 8d. The controller 70 then performs a control to drive the pump 6 at full speed (step ST4). To prevent a blockage in the flow passage, a driving control for the pump 6 in step ST4 is performed after an opening and closing control for the flow rate control devices 8 in step ST3.

The controller 70 calculates the pump flow rate Grp of the pump 6 on the basis of equation (1) from the difference between the pressure detected by the pump outlet-side pressure sensor 9 and the pressure detected by the pump inlet-side pressure sensor 10 (step ST5). The controller 70 then calculates the total flow passage resistance R of the path 41 set as the path X (step ST6). In this case, the controller 70 calculates the flow passage resistance Rb of the path 41b. The entire water transferred by the pump 6 flows to the path 41b, and thus the flow passage resistance Rb can be expressed by equation (5b) below, where ΔPb is the difference between the pressure detected by the pump outlet-side pressure sensor 9 and the pressure detected by the indoor-side pressure sensor 11b. The pump flow rate Grp of the pump 6 can be calculated from equation (1), and thus the controller 70 calculates the flow passage resistance Rb from equation (5b).

$$Rb=\Delta Pb \div Grp^2 \tag{5b}$$

Where the paths other than the path 41 set as the path X are paths y, the controller 70 calculates the partial flow passage resistance Z of each of the paths y on the basis of the difference between the pressure detected by the pump outlet-side pressure sensor 9 and the pressure detected by the indoor-side pressure sensor 11 (step ST7). In this case, the controller 70 calculates a temporary value of the partial flow passage resistance Za of the path 41a on the basis of equation (6a). The controller 70 calculates a temporary value of the partial flow passage resistance Zc of the path 41c on the basis of equation (6c). The controller 70 calculates a temporary value of the partial flow passage resistance Zd of the path 41d on the basis of equation (6d).

$$Za=\text{(greater one of } (\Delta Pa \div Grp^2) \text{ and (partial flow passage resistance } Za \text{ before the process of step ST7))} \tag{6a}$$

$$Zc=\text{(greater one of } (\Delta Pc \div Grp^2) \text{ and (partial flow passage resistance } Zc \text{ before the process of step ST7))} \tag{6c}$$

$$Zd=\text{(greater one of } (\Delta Pd \div Grp^2) \text{ and (partial flow passage resistance } Zd \text{ before the process of step ST7))} \tag{6d}$$

The controller 70 repeatedly performs the processes of steps ST2 to ST7. Thus, the controller 70 stores, as a final value, the highest partial flow passage resistance Z obtained by the processes in the storage unit 72. For example, when X=b, the partial flow passage resistances Za and Zc become maximum; however, the partial flow passage resistance Zd does not become maximum since the partial flow passage resistance Zd does not include the flow passage resistance of the supply main pipe 20c. When X=c, the pressure difference ΔPd, which includes a pressure loss at the supply main pipe 20c, is measured, and thus the maximum value of the partial flow passage resistance Zd is updated.

The controller 70 determines whether the total flow passage resistance R at all the paths 41 is calculated or not (step ST8). When determining that the total flow passage resistance R at all the paths 41 is not calculated, the controller 70 sets a path 41 for which the flow passage resistance R is not calculated, as the path X, and performs the processes of steps ST2 to ST7. Next, the following description is made with respect to the case where the path 41 set as the path X is the path 41a.

The controller 70 performs a control to fully open the flow rate control device 8a at the path 41a set as the path X and a control to fully close the other flow rate control devices 8b, 8c, and 8d (step ST3). The controller 70 then drives the pump 6 at full speed (step ST4). The controller 70 calculates the pump flow rate Grp at the pump 6 on the basis of equation (1) from the difference between the pressure detected by the pump outlet-side pressure sensor 9 and the pressure detected by the pump inlet-side pressure sensor 10 (step ST5).

The controller 70 calculates the flow passage resistance Ra of the path 41a. The entire water transferred by the pump 6 flows to the path 41a, and thus the flow passage resistance Ra can be expressed by equation (5a) below. The pressure difference ΔPa is the difference between the pressure detected by the pump outlet-side pressure sensor 9 and the pressure detected by the indoor-side pressure sensor 11a. The pump flow rate Grp at the pump 6 can be calculated from equation (1). The controller 70 calculates Ra from equation (5a) (step ST6).

$$Ra=\Delta Pa \div Grp^2 \tag{5a}$$

The controller 70 updates the partial flow passage resistances Zb, Zc, and Zd using equation (6b) and equations (6c) and (6d) described above (step ST7).

$$Zb=\text{(greater one of } (\Delta Pb \div Grp^2) \text{ or (partial flow passage resistance } Zb \text{ before the process of step ST7))} \tag{6b}$$

Similarly, the controller 70 repeatedly performs the processes of steps ST3 to ST7 also in the case where the path 41 set as the path X is the path 41c and the case where the path 41 set as the path X is the path 41d.

$$Rc=\Delta Pc \div Grp^2 \tag{5c}$$

$$Rd=\Delta Pd \div Grp^2 \tag{5d}$$

When determining in step ST8 that the total flow passage resistance R is calculated, the controller 70 makes a determination regarding the branching order and calculates the flow passage resistances A and B (step ST9). The controller 70 determines the branching order in ascending order of the partial flow passage resistance Z. In the air-conditioning apparatus 100 of Embodiment 1, the partial flow passage resistance Za<the partial flow passage resistance Zb<the partial flow passage resistance Zc=the partial flow passage resistance Zd. Thus, it can be determined that branching occurs at the path 41a, the path 41b, and the path 41c, and the path 41d in this order. In this case, the most downstream path 41 and the second most downstream path 41t (the paths 41c and 41d) do not need to be distinguished from each other.

The controller 70 determines the branching order, whereby regarding the flow passage resistances Ra to Rd, equations (7a) to (7d) and equations (8a) to (8d) are established. The controller 70 calculates the flow passage resistances Aa, Ab, Ac, Ba, Bb, and Bc and the flow passage resistance Ad+the flow passage resistance Bd by solving equations (7a) to (7d) and equation (8a) to (8d) as simultaneous linear equations. Although the flow passage resistance Ad and the flow passage resistance Bd cannot be individually obtained, it does not affect calculation of the flow rates.

$$Aa+Ba=Ra \tag{7a}$$

$$Aa+Ab+Bb=Rb \tag{7b}$$

$$Aa+Ab+Ac+Bc=Rc \quad (7c)$$

$$Aa+Ab+Ac+Ad+Bd=Rd \quad (7d)$$

$$Aa=Za \quad (8a)$$

$$Aa+Ab=Zb \quad (8b)$$

$$Aa+Ab+Ac=Zc \quad (8c)$$

$$Aa+Ab+Ac=Zd \quad (8d)$$

The controller 70 calculates the branching order of the paths 41, the flow passage resistances Aa, Ab, Ac, Ba, Bb, and Bc, and the flow passage resistance Ad+the flow passage resistance Bd by following the above procedure. When the second operation is performed, the controller 70 can calculate the flow rate of water that flows through each of the paths 41 using equations (3a) to (3d) and equations (4a) to (4d), which are described above.

Regarding the processes that are performed by the controller 70, the above description is made with respect to the calculation of the flow passage resistances A, the flow passage resistance B, the flow rate of water, etc., in the case where four indoor units 93 are installed. The number of variables and the number of equations vary depending on the number of indoor units 93. It should be noted that the number of relational expressions is larger than the number of unknown variables, and thus regardless of the number of indoor units 93, the controller 70 can calculate, for example, the resistance of a flow passage in the water circuit 82 from, for example, pressures obtained in the first operation.

Figure 3:
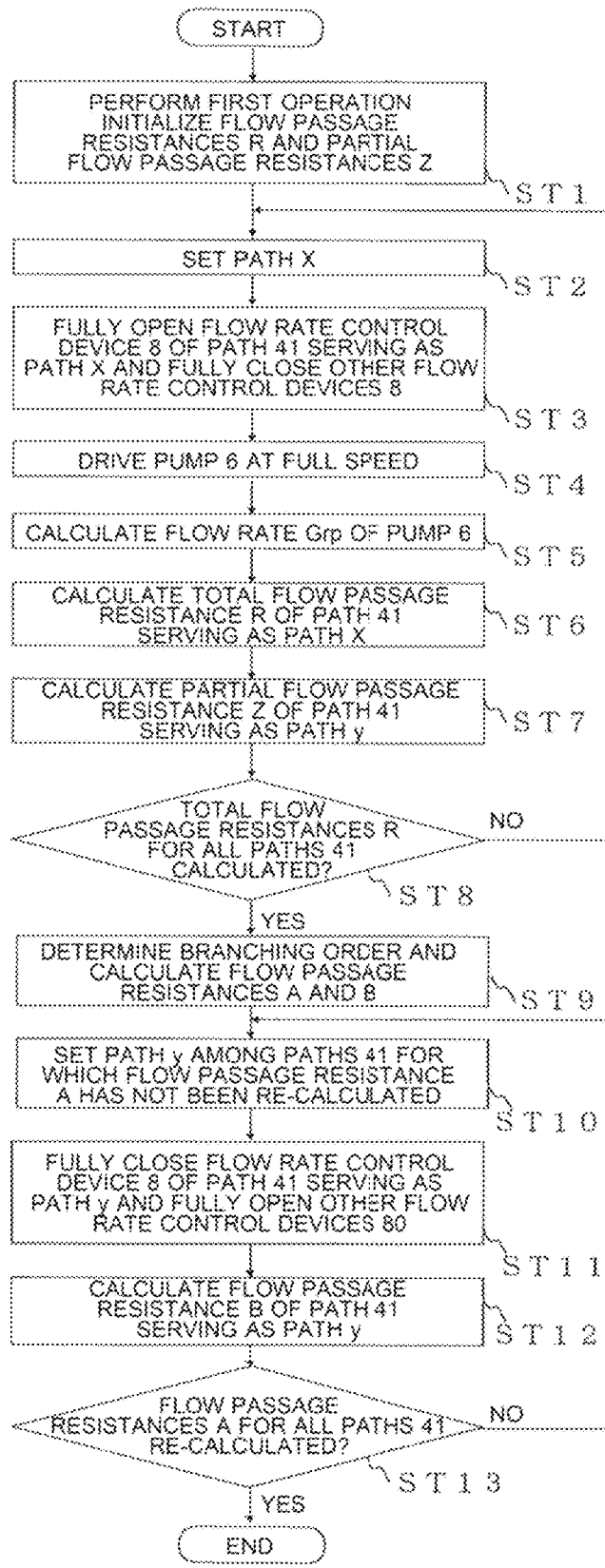
FIG. 3 is a diagram illustrating another example of the processing procedure regarding the calculation of a flow passage resistance that is performed by the controller of the air-conditioning apparatus according to Embodiment 1.

FIG. 3 is a diagram illustrating another example of the processing procedure regarding calculation of a flow passage resistance that is performed by the controller of the air-conditioning apparatus according to Embodiment 1. The processes by the controller 70 as indicated in FIG. 3 are different from those by the controller 70 as indicated in FIG. 2 in that processes of steps ST10 to ST13 are added.

When performing the processes of steps ST10 to ST13, the air-conditioning apparatus 100 operates, with one of the flow rate control devices 8 closed and the others opened. In this case, the flow rate control devices 8 are successively closed such that one of the flow rate control devices 8 is opened at a time. The controller 70 re-calculates the flow passage resistances A and the flow passage resistances B from data obtained through this operation.

By performing the processes of steps ST10 to ST13, the controller 70 can calculate the pressure loss at each of the paths 41 under conditions in which the pump flow rate at the pump 6 is high and the pressure loss at, for example, the main pipe, etc., is large. Thus, the flow passage resistances A, etc., can be accurately re-calculated using data that is not easily affected by errors in detection by the pressure sensors.

Referring to FIG. 3, the processes of the steps up to step ST9 are substantially the same as those as described with reference to FIG. 2. Of the paths 41 for which the flow passage resistance A is not re-calculated, a path 41 having the lowest partial flow passage resistance Z is set as a path y that is a calculation target (step ST10). The following description is made with respect to the case where the path 41 set as the path y is the path 41a.

The controller 70 performs in the first operation, a control to fully close the flow rate control device 8 at the path 41 set as the path y and a control to fully open the other flow rate control devices 8 (step ST11). In this case, the controller 70 performs a control to fully close the flow rate control device 8a at the path 41a and a control to fully open the other flow rate control devices 8b, 8c, and 8d.

The flow passage resistance B at the path 41 set as the path y is calculated (step ST12). For example, in this case, in equation (3a) described above, the pressure difference ΔPa and the flow rate Grma are known. The flow rate Grsa=0, and thus the flow passage resistance Aa can be calculated. Next, in the case where y=b, in equation (3b) described above, the pressure difference ΔPb and the flow rate Grma are known, the flow rate Grsb=0, and the flow rate Grmb is unknown. The flow rate Grmb can be calculated since the pressure difference ΔPa, the flow rate Grma, the flow passage resistance Aa, and the flow passage resistance Ba are known in equations (3a) and (4a) described above. Thus, the flow passage resistance Ab can be re-calculated from equations (3a), (4a), and (3b).

The controller 70 determines whether the flow passage resistances A at all the paths 41 are re-calculated or not (step ST13). When determining that there is a flow passage resistance A that is not re-calculated, the controller 70 sets the path 41 for which a re-calculation is not performed, as the path y, and performs steps ST10 to ST12. The flow passage resistance Ac and the flow passage resistance Ad can also be similarly re-calculated.

<Calculation of Heat Exchange Amount>

The controller 70 can calculate the flow passage resistance of each path 41 by performing processing in accordance with the above procedure and calculate the flow rate of water that flows through each use-side heat exchanger 7. The controller 70 can calculate the heat exchange amount of the use-side heat exchanger 7 using equation (9) on the basis of the calculated flow rate and also using the use-side heat exchanger inlet-side temperature sensor 13 and the use-side heat exchanger outlet-side temperature sensor 14 provided on the upstream side, which is the water inflow side of the use-side heat exchanger 7, and on the downstream side, which is the water outflow side of the use-side heat exchanger 7.

(Heat exchange amount)=(specific heat of, for example, water or brine)×(temperature difference between use-side heat exchanger inlet-side temperature sensor 13 and use-side heat exchanger outlet-side temperature sensor 14)×(flow rate of water) (9)

The heat transfer rate of water at the use-side heat exchanger 7 is high when the flow rate of water is high and the Reynolds number is large. The higher the flow rate of water, the stronger the transporting power of water. Thus, the pump flow rate at the pump 6 and the flow rates of the use-side heat exchangers 7 need to be controlled in order to improve the coefficient of performance of and energy saving of the entirety air-conditioning apparatus 100. Thus, for example, data obtained by the formula "the pump flow rate at the pump 6–the pressure loss of the pump 6–the input characteristics of the pump 6" and data obtained by the formula "the flow rate of each heat exchanger–the pressure loss of the heat exchanger–the heat transfer rate characteristic of the heat exchanger" are stored in advance in the storage unit 72. A control can be performed by operating an input to the pump 6 and the flow rate control devices 8 such that the power saving performance of the air-conditioning apparatus 100 is improved.

<Correction of Relational Expression Between Flow Rate and Pressure>

When the operating time of the air-conditioning apparatus 100 is long, there is a possibility that the relationship between flow rate and pressure will change due to rust on the pipes, scale formed by reaction with, for example, ions in water, or clogging of a strainer for catching wastes.

The air-conditioning apparatus 100 performs the first operation not only in a test run but also, for example, at regular intervals in the case where certain operation conditions are satisfied. The relationship between the water flow rate and pressure at the each of the paths 41 is updated by repeatedly performing the first operation. Thus, the controller 70 can maintain the accuracy of calculation of, for example, the flow passage resistance and the flow rate. In this case, as an example of the regular intervals, few-year intervals may be set; that is, the first operation may be performed once in every few years. The controller 70 may perform the first operation to update data regarding the flow passage resistances as long as a maintenance operator sends a command to the controller 70 at the time of performing maintenance of the components.

As described above, in Embodiment 1, in the first operation, the controller 70 controls the flow rate control devices 8 individually to perform the operation, calculates the flow passage resistances, etc., on the basis of obtained pressures, and store the flow passage resistances, etc., as data in the storage unit 72. In the second operation, the flow rates of water that flows through the respective use-side heat exchangers 7 are calculated on the basis of the data on the flow passage resistances, etc., stored in the storage unit 72 of the controller 70. The flow rates of water that flows as a heat medium, through the respective use-side heat exchangers 7 can be estimated with high accuracy by calculating the flow rates of water that flows through the respective use-side heat exchangers 7 on the basis of, for example, the pressure loss at the water circuit 82.

Embodiment 2

Figure 4:
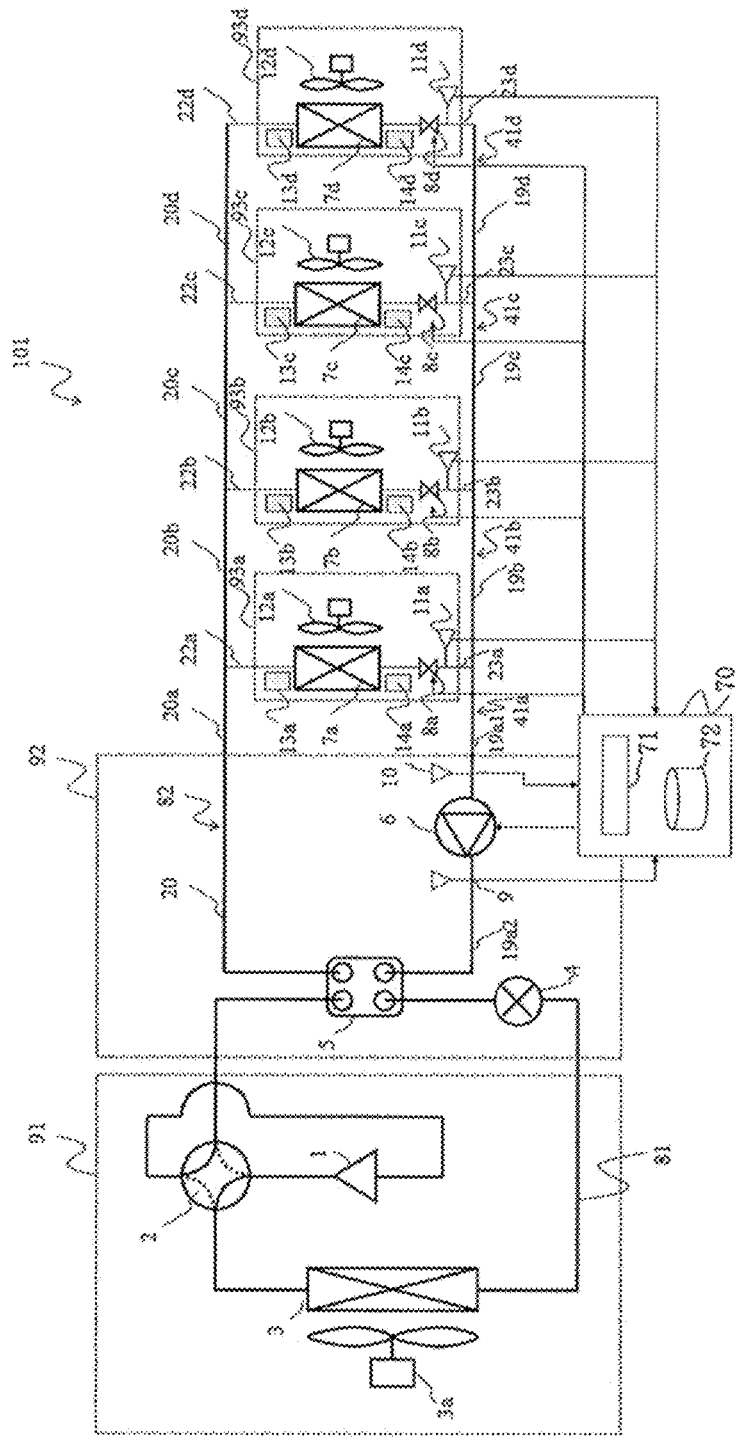
FIG. 4 is a diagram illustrating a configuration of an air-conditioning apparatus according to Embodiment 2.

FIG. 4 is a diagram illustrating the configuration of an air-conditioning apparatus according to Embodiment 2. In an air-conditioning apparatus 101 as illustrated in FIG. 4, components that are denoted by the same reference signs as those in Embodiment 1 perform similar operations to those in Embodiment 1. In the air-conditioning apparatus 10 according to Embodiment 2, the indoor-side pressure sensors 11 are provided downstream of the respective flow rate control devices 8; that is, the indoor-side pressure sensors 11 are provided on the water outflow sides of the flow rate control devices 8. In this regard, the air-conditioning apparatus 101 according to Embodiment 2 is different from the air-conditioning apparatus 100 according to Embodiment 1. Furthermore, they are also different in the way in which the paths 41 are set.

In Embodiment 2, the path 41a, the path 41b, the path 41c, and the path 41d are defined as follows: the path 41a is formed by the return branch pipe 23a and the return main pipe 19a1; the path 41b is formed by the return branch pipe 23b and the return main pipes 19b and 19a1: the path 41c is formed by the return branch pipe 23c and the return main pipes 19c, 19b, and 19a1; and the path 41d is formed by the return branch pipe 23d and the return main pipes 19d, 19c, 19b, and 19a1.

In the air-conditioning apparatus 101 according to Embodiment 2, the controller 70 performs, for example, calculation using the pump inlet-side pressure sensor 10 provided on the suction side of the pump 6, instead of the pump outlet-side pressure sensor 9 provided on the discharge side of the pump 6. As a result, the controller 70 can calculate the flow rates of water that flows through the respective use-side heat exchangers 7 in accordance with a similar processing procedure to that described regarding Embodiment 1.

In the air-conditioning apparatus 101 according to Embodiment 2, the use-side heat exchangers 7 are not provided in the paths 41. The pressure losses at the paths 41 are smaller than those in the air-conditioning apparatus 100 according to Embodiment 1. Thus, a higher-precision pressure sensor may be necessary. The pressure differences ΔPa to ΔPd are defined as the differences in pressure between the pump inlet-side pressure sensor 10 and the respective indoor-side pressure sensors 11a to 11d. Therefore, for example, calculations can be performed using the same equations as in Embodiment 1.

In this case, in order to determine whether the indoor-side pressure sensors 11a to 11d are located upstream or downstream of the flow rate control devices 8, for example, it is appropriate that data on the locations of the indoor-side pressure sensors 11a to 11d be stored in advance in the storage unit 72 of the controller 70. Alternatively, for example, the above determination may be made based on a change in a pressure that is related to detection performed by the indoor-side pressure sensor 11 when the pump 6 is opened, with only one of the flow rate control devices 8 opened, and the opening degree of the flow rate control device 8 is changed.

When the controller 70 performs a control to reduce the opening degree of the flow rate control device 8, in the case where the pressure detected by the indoor-side pressure sensor 11 increases, it can be determined that the indoor-side pressure sensor 11 is provided upstream of the flow rate control device 8, and in the case where the value detected by the indoor-side pressure sensor 11 decreases, it can be determined that the indoor-side pressure sensor 11 is provided downstream of the flow rate control device 8.

Embodiment 3

Figure 5:
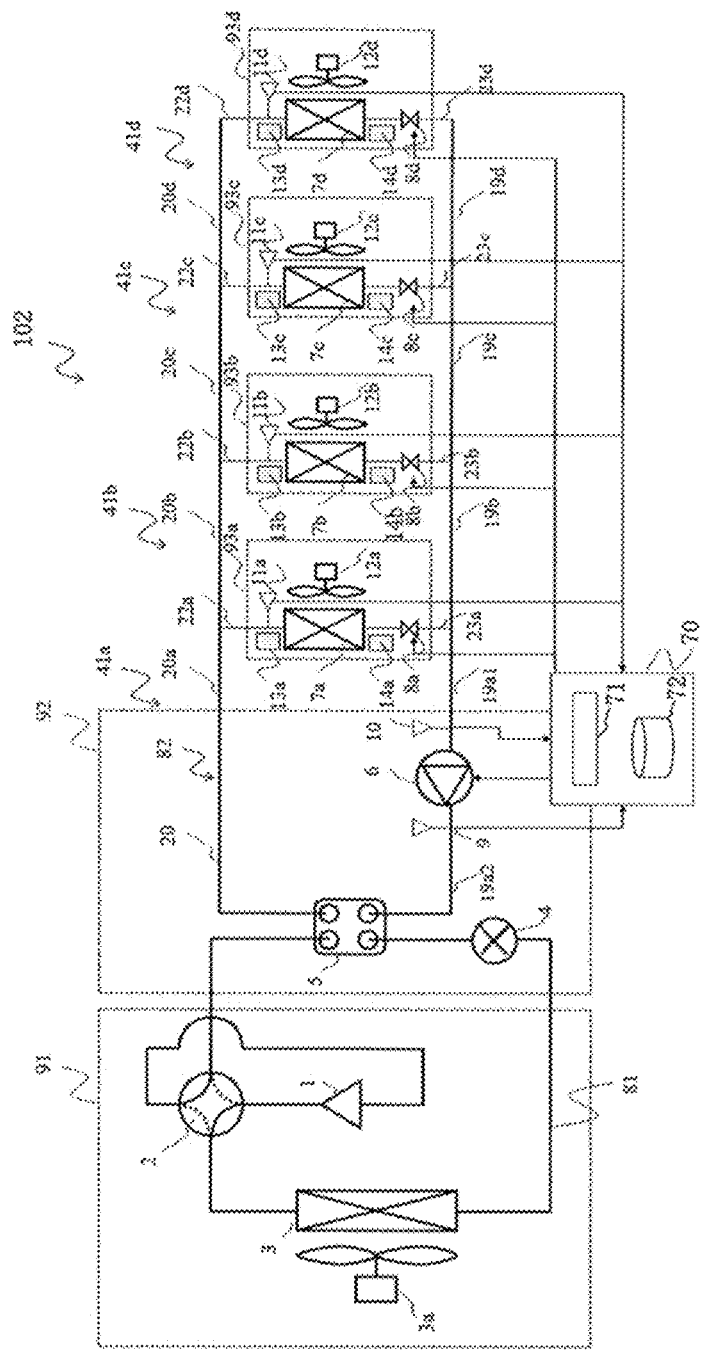
FIG. 5 is a diagram illustrating a configuration of an air-conditioning apparatus according to Embodiment 3.

FIG. 5 is a diagram illustrating the configuration of an air-conditioning apparatus according to Embodiment 3. In an air-conditioning apparatus 102 as illustrated in FIG. 5, components that are denoted by the same reference signs as those in Embodiment 1 perform similar operations to those in Embodiment 1. Unlike the air-conditioning apparatus 100 according to Embodiment 1, in the air-conditioning apparatus 102 according to Embodiment 3, all the indoor-side pressure sensors 11 are provided upstream of the use-side heat exchangers 7, all the indoor-side pressure sensors 11 are provided on the water inflow side of the use-side heat exchangers 7, and the way in which the paths 41 are set is also different from that in the air-conditioning apparatus 100 according to Embodiment 1.

In the air-conditioning apparatus 102 according to Embodiment 3, the paths 41 that extend from the pump 6 to the indoor-side pressure sensors 11 through the pump outlet-side pressure sensor 9 do not extend through the use-side heat exchangers 7. Thus, the use-side heat exchangers 7 are excluded from the paths 41. Except for this point, the total flow passage resistance R is calculated in accordance with the same procedure as in Embodiment 1, and the flow rates of water that flows through the respective use-side heat exchangers 7 can be obtained. In this case, the use-side heat exchangers 7 are not provided in the paths 41, and the pressure losses at the paths 41 are thus smaller than those in the air-conditioning apparatus 100 according to Embodi-

Embodiment 4

Figure 6:
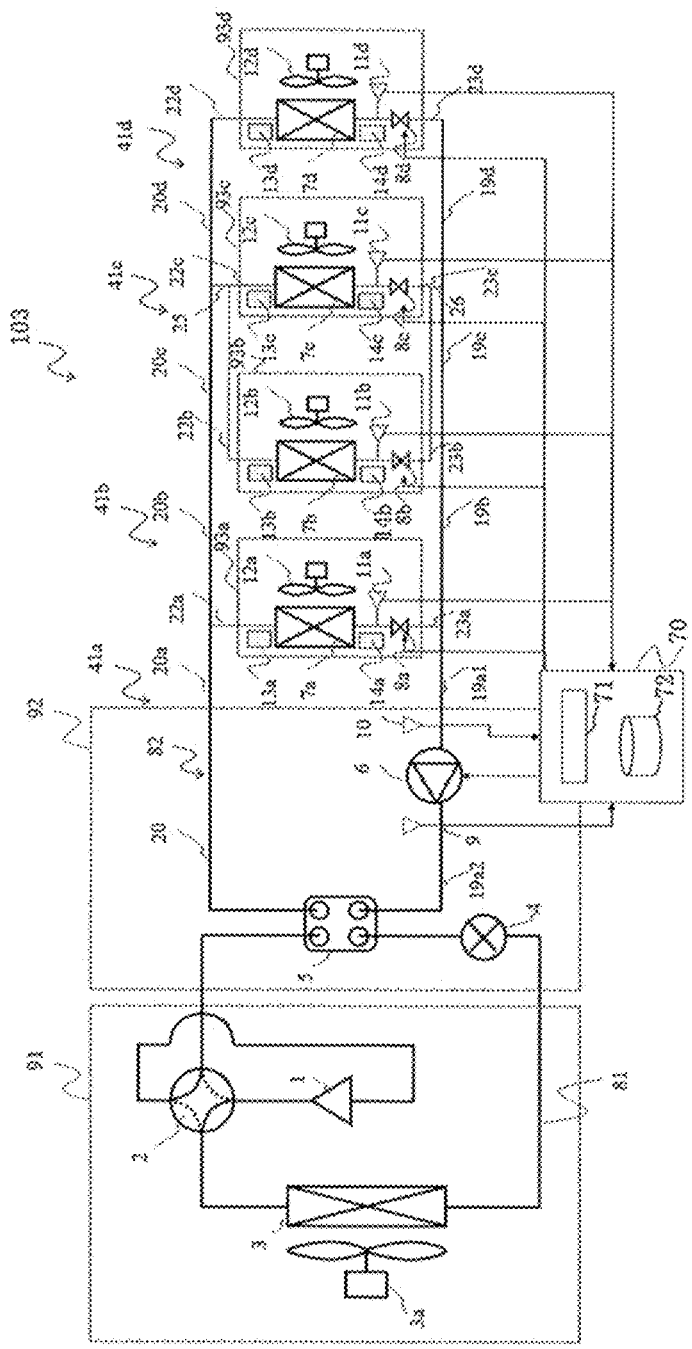
FIG. 6 is a diagram illustrating a configuration of an air-conditioning apparatus according to Embodiment 4.

FIG. 6 is a diagram illustrating the configuration of an air-conditioning apparatus according to Embodiment 4. In an air-conditioning apparatus 103 as illustrated in FIG. 6, components that are denoted by the same reference signs as those in Embodiment 1 perform similar operations to those in Embodiment 1. Unlike the air-conditioning apparatus 100 according to Embodiment 1, in the air-conditioning apparatus 103 according to Embodiment 4, the supply branch pipe 22b branches off from midway part of the supply branch pipe 22c and is connected to the use-side heat exchanger 7b, and the return branch pipe 23b extends from the use-side heat exchanger 7b and is connected to midway part of the return branch pipe 23c. Furthermore, referring to FIG. 6, part of the supply branch pipe 22c that is located between a branching point from the supply main pipe 20c and a branching point to the supply branch pipe 22b will be referred to as a branching branch pipe 25. In addition, part of the return branch pipe 23c that is located between a junction with the return branch pipe 23b and a junction with the return main pipe 19c will be referred to as a junction branch pipe 26.

When the branching branch pipe 25 and the junction branch pipe 26 are short, the flow passage resistance at the branching branch pipe 25 and that at the junction branch pipe 26 can be ignored for the path 41b and the path 41c. Thus, the calculation method is the same as that in Embodiment 1.

In contrast, when the branching branch pipe 25 is long, the flow passage resistance is denoted by C, and equations (3a) to (3d) and equations (4a) to (4d) described above can be replaced with equations (3a1) to (3d1) and equations (4a1) to (4d1).

Path 41a:

$$\Delta Pa = Grma^2 \times Aa + Grsa^2 \times Ba \quad (3a1)$$

Path 41b:

$$\Delta Pb = Grma^2 \times Aa + Grmb^2 \times Ab + (Grsb + Grsc)^2 \times C + Grsb^2 \times Bb \quad (3b1)$$

Path 41c:

$$\Delta Pc = Grma^2 \times Aa + Grmb^2 \times Ab + (Grsb + Grsc)^2 \times C + Grsc^2 \times Bc \quad (3c1)$$

Path 41d:

$$\Delta Pd = Grma^2 \times Aa + Grmb^2 \times Ab + Grmd^2 \times Ad + Grsd^2 \times Bd \quad (3d1)$$

$$Grmb = Grma - Grsa \quad (4a1)$$

$$Grmc = Grmb \quad (4b1)$$

$$Grmd = Grmc - Grsc \quad (4c1)$$

$$Grsd = Grmd \quad (4d1)$$

In equations (3a1) to (3d1) and equations (4a1) to (4d1), the pressure difference $\Delta Pa$, the pressure difference $\Delta Pb$, the pressure difference $\Delta Pc$, and the pressure difference $\Delta Pd$ are values obtained on the basis of pressures detected by the various pressure sensors. The flow passage resistance Aa, the flow passage resistance Ab, the flow passage resistance Ad, the flow passage resistance Ba, the flow passage resistance Bb, the flow passage resistance Bc, the flow passage resistance Bd, and the flow passage resistance C are constants calculated by performing the first operation. The flow rate Grma is equal to the flow rate of water transferred from the pump 6 and can be calculated from equation (1).

Thus, the following seven flow rates are unknowns: the flow rate Grmb; the flow rate Grmc; the flow rate Grmd; the flow rate Grsa; the flow rate Grsb; the flow rate Grsc; and the flow rate Grsd. Since eight equations (3a1) to (3d1) and (4a1) to (4d1) are present, all the unknowns can be calculated. For example, the controller 70 calculates the flow rate Grsa from equation (3a1), calculates the flow rates Grmb, Grsb, Grmc, and Grsc from equations (3b1), (3c1), (4a1), and (4b1), and calculates the flow rates Grmd and Grsd from equations (4c1) and (4d1).

In Embodiment 4, the controller 70 calculates the flow passage resistance C. In step ST9 in FIG. 2 described above, the controller 70 performs a process of calculating the flow passage resistance C. The flow passage resistance C can be calculated on the basis of the following data: data that is obtained when the first operation is performed, with the flow rate control device 8b opened and the other flow rate control devices 8 closed; data that is obtained when the first operation is performed, with the flow rate control device 8c opened and the other flow rate control devices 8 closed; and data that is obtained when the first operation is performed, with the flow rate control device 8d opened and the other flow rate control devices 8 closed. Thus, an additional operation is not necessary in steps ST2 to ST7 to calculate the flow passage resistance C.

In this case, it is difficult to determine, through the first operation, how pipes in the air-conditioning apparatus 103 as illustrated in FIG. 6 branch off. It is therefore preferable that the order in which the flow rate control devices 8 are opened and closed be determined in advance at the time of construction of the air-conditioning apparatus, and settings or data be stored in the storage unit 72. The controller 70 includes, for example, a DIP switch (not illustrated) that can be operated from the outside. The controller 70 may read the order in which the flow rate control devices 8 are opened and closed, from an on-off pattern of the switch. Moreover, for example, the controller 70 communicates with other processing terminals such as a personal computer and may be set capable of overwriting the order in which the flow rate control devices 8 are opened and closed and that is stored in the storage unit 72.

In the air-conditioning apparatus 103 as illustrated in FIG. 6, for example, the opening and closing order of the first rate control device is 1-2-3; and 1 is the flow rate control device 8a, 2 is the flow rate control device 8b and the flow rate control device 8c, and 3 is the flow rate control device 8d. That is, the flow rate control device 8a; the flow rate control device 8b and the flow rate control device 8c; and the flow rate control device 8d are opened and closed in this order. In the first operation, operation is performed in a state in which the flow rate control devices 8 are opened in ascending order and the other flow rate control devices 8 are closed. In this case, the devices having the same turn are treated as devices that are provided at pipes branching from a branch pipe.

As described above, in the air-conditioning apparatus 103 according to Embodiment 4, since the order in which the flow rate control devices 8 are opened and closed is determined in advance, even in the case where a branch pipe branches off and the branch pipes join each other, the flow rates of water that flows through the respective paths 41 can be calculated with a high accuracy.

Embodiment 5

Regarding Embodiments 1 to 4, it is described by way of example that a single outdoor unit 91 is installed; however, two or more outdoor units 91 may be installed. Furthermore, although it is described above that the outdoor unit 91 and the relay unit 92 are separate units, it is not limiting. For example, an apparatus including the outdoor unit 91 and an apparatus including the relay unit 92 may be provided as a single unit. Furthermore, it is not indispensable that the outdoor unit 91 is installed outside the building. For example, in the case where in the building, outside air can be sucked into the building and let out of the building, a single unit having the function of the outdoor unit 91 and the function of the relay unit 92 may be made as the heat-source-side device and may be installed in the building.

REFERENCE SIGNS LIST

1: compressor, 2: flow switching valve, 3: outdoor heat exchanger, 3a: outdoor fan, 4: expansion device, 5: intermediate heat exchanger, 6: pump, 7, 7a, 7b, 7c, 7d: use-side heat exchanger, 8, 8a, 8b, 8c, 8d: flow rate control device, 9: pump outlet-side pressure sensor, 10: pump inlet-side pressure sensor, 11, 11a, 11b, 11c, 11d: indoor-side pressure sensor, 12, 12a, 12b, 12c, 12d: indoor fan, 13, 13a, 13b, 13c, 13d: use-side heat exchanger inlet-side temperature sensor, 14, 14a, 14b, 14c, 14d: use-side heat exchanger outlet-side temperature sensor, 19, 19a, 19a1, 19a2, 19b, 19c, 19d: return main pipe, 20, 20a, 20b, 20c, 20d: supply main pipe, 22, 22a, 22b, 22c, 22d: supply branch pipe, 23, 23a, 23b, 23c, 23d: return branch pipe, 25: branching branch pipe, 26: junction branch pipe, 41, 41a, 41b, 41c, 41d: path, 70: controller, 71: control processing unit, 72: storage unit, 81: refrigerant circuit, 82: water circuit, 91: outdoor unit, 92: relay unit, 93, 93a, 93b, 93c, 93d: indoor unit, 100, 101, 102: air-conditioning apparatus.

The invention claimed is:

1. An air-conditioning apparatus comprising:
a heat-source-side device configured to heat or cool a heat medium serving as a medium that transfers heat;
a pump configured to suck the heat medium and transfer the heat medium;
a plurality of use-side heat exchangers each configured to cause heat exchange to be performed between the heat medium transferred by the pump and indoor air to be conditioned;
a heat medium circuit that includes a common pipe at which the heat-source-side device and the pump are provided, and parallel pipes that branch off from the common pipe and that are pipes at each of which an associated one of the plurality of use-side heat exchangers is provided, the heat medium circuit being provided such that the common pipe and the parallel pipes are connected, whereby the heat medium circulates;
a plurality of flow rate control devices provided in association with the use-side heat exchangers and at least upstream or downstream of the use-side heat exchangers, the plurality of flow rate control devices being configured to control flow rates of the heat medium that passes through the use-side heat exchangers;
a plurality of indoor-side pressure sensors each configured to detect a pressure of the heat medium at least on a heat-medium inflow side or a heat-medium outflow side of an associated one of the flow rate control devices;
at least one of a pump inlet-side pressure sensor configured to detect a pressure of the heat medium on a suction side of the pump and a pump outlet-side pressure sensor configured to detect a pressure of the heat medium on a transferring side of the pump;
a flow rate detection device configured to detect a pump flow rate that is a flow rate of the heat medium that flows in the pump; and
a controller configured to control components included in the heat medium circuit,
wherein the controller is configured to:
perform a first operation in which the heat medium circuit is caused to circulate the heat medium, the flow rate control devices are individually opened or closed in a predetermined pattern, and data regarding flow rates and pressures of the heat medium that flows through the respective use-side heat exchangers is obtained, and a second operation in which after the first operation, the heat medium is caused to pass through the use-side heat exchangers that supply heat to the indoor air, and
calculate flow rates of the heat medium that flows through the respective use-side heat exchangers in the second operation, from pump flow rates and pressures in the first operation and the second operation, the pressures being detected by the indoor-side pressure sensors associated with the respective flow rate control devices and the pump inlet-side pressure sensor or the pump outlet-side pressure sensor.

2. The air-conditioning apparatus of claim 1, wherein
the controller includes a storage unit configured to store data, and
the controller is configured to
store, as data in the storage unit, a relationship between the flow rate and the pressure of the heat medium in a path along which the heat medium flows, the relationship being obtained from the pump flow rate and pressures detected by the indoor-side pressure sensors associated with the respective flow rate control devices in the first operation, and
calculate flow rates of the heat medium that flows through the respective use-side heat exchangers from the pump flow rate, pressures detected by the indoor-side pressure sensors associated with the respective flow rate control devices, and a pressure detected by the pump inlet-side pressure sensor or the pump outlet-side pressure sensor in the second operation, based on the data regarding the relationship between the flow rate and pressure of the heat medium and stored in the storage unit.

3. The air-conditioning apparatus of claim 1, wherein the controller is configured to perform, in the first operation, an operation in which the heat medium is circulated, with one of the flow rate control devices opened and an other or others of the flow rate control devices closed, and the operation is performed while the flow rate control devices are successively opened.

4. The air-conditioning apparatus of claim 3, wherein the controller is configured to performs, in the first operation, an operation in which the heat medium is circulated, with one of the flow rate control devices closed and an other or others of the flow rate control devices opened, and the operation is performed while the flow rate control devices are successively closed.

5. The air-conditioning apparatus of claim 3, wherein the controller is configured to open and close the flow rate control devices in a predetermined order to perform an operation of circulating the heat medium.

6. The air-conditioning apparatus of claim 1, further comprising both the pump inlet-side pressure sensor and the pump outlet-side pressure sensor,
wherein the controller is configured to calculate the pump flow rate based on a pressure difference between a pressure detected by the pump inlet-side pressure sensor and a pressure detected by the pump outlet-side pressure sensor.

7. The air-conditioning apparatus of claim 1, wherein the controller is configured to perform the first operation at certain intervals to update pressures related to detection performed by the pressure sensors.

8. The air-conditioning apparatus of claim 1, further comprising:
a plurality of use-side heat exchanger temperature sensors that are provided upstream and downstream of the respective use-side heat exchangers and are each configured to detect a temperature of the heat medium,
wherein the controller is configured to calculate heat exchange amounts of the use-side heat exchangers from temperatures detected by the use-side heat exchanger temperature sensors and flow rates of the heat medium that flows through the use-side heat exchangers.

9. The air-conditioning apparatus of claim 1, wherein the heat-source-side device includes
an outdoor unit including a compressor configured to compress refrigerant and an outdoor heat exchanger configured to cause heat exchange to be performed between the refrigerant and air, and
a refrigerant circuit in which a relay unit that includes an expansion device and an intermediate heat exchanger is connected to the outdoor unit by a pipe, the expansion device being configured to reduce a pressure of the refrigerant, the intermediate heat exchanger being configured to cause heat exchange to be performed between the refrigerant and the heat medium.

10. A heat-medium flow-rate calculation method that is carried out using a controller configured to control a heat medium circuit in which for a heat-source-side device and a pump, a plurality of use-side heat exchangers and a plurality of flow rate control devices are connected in parallel by pipes, the heat-source-side device being configured to heat or cool a heat medium serving as a medium that transfers heat, the pump being configured to suck and transfer the heat medium, the plurality of use-side heat exchangers being each configured to cause heat exchange to be performed between the heat medium and indoor air to be conditioned, the flow rate control devices being control flow rates of the heat medium that passes through the use-side heat exchangers,
the heat-medium flow-rate calculation method comprising:
performing a first operation in which an operation of circulating the heat medium, with one of the flow rate control devices opened and an other or others of the flow rate control devices closed is performed, while the flow rate control devices are successively opened, and obtaining data regarding paths that extend from the pump to the respective use-side heat exchangers, from pressures of the heat medium that passes through the respective flow rate control devices, at least one of a pressure of the heat medium on a suction side of the pump and a pressure of the heat medium on the transferring side of the pump, and a pump flow rate; and
in a second operation in which the heat medium is caused to pass through the use-side heat exchangers and heat is supplied to the indoor air,
calculating flow rates of the heat medium that flows through the respective use-side heat exchangers, from pressures of the heat medium that passes through the respective flow rate control devices, at least either pressures of the heat medium on the suction side of the pump or pressures of the heat medium on the transferring side of the pump, and pump flow rates in the first operation and the second operation.

11. The air-conditioning apparatus of claim 2, wherein the controller is configured to perform, in the first operation, an operation in which the heat medium is circulated, with one of the flow rate control devices opened and an other or others of the flow rate control devices closed, and the operation is performed while the flow rate control devices are successively opened.

12. The air-conditioning apparatus of claim 11, wherein the controller is configured to performs, in the first operation, an operation in which the heat medium is circulated, with one of the flow rate control devices closed and an other or others of the flow rate control devices opened, and the operation is performed while the flow rate control devices are successively closed.

13. The air-conditioning apparatus of claim 12, wherein the controller is configured to open and close the flow rate control devices in a predetermined order to perform an operation of circulating the heat medium.

\* \* \* \* \*